F. KUTWICZ.
COLLAPSIBLE CANE.
APPLICATION FILED FEB. 28, 1921.
1,396,372.
Patented Nov. 8, 1921.
2 SHEETS—SHEET 1.
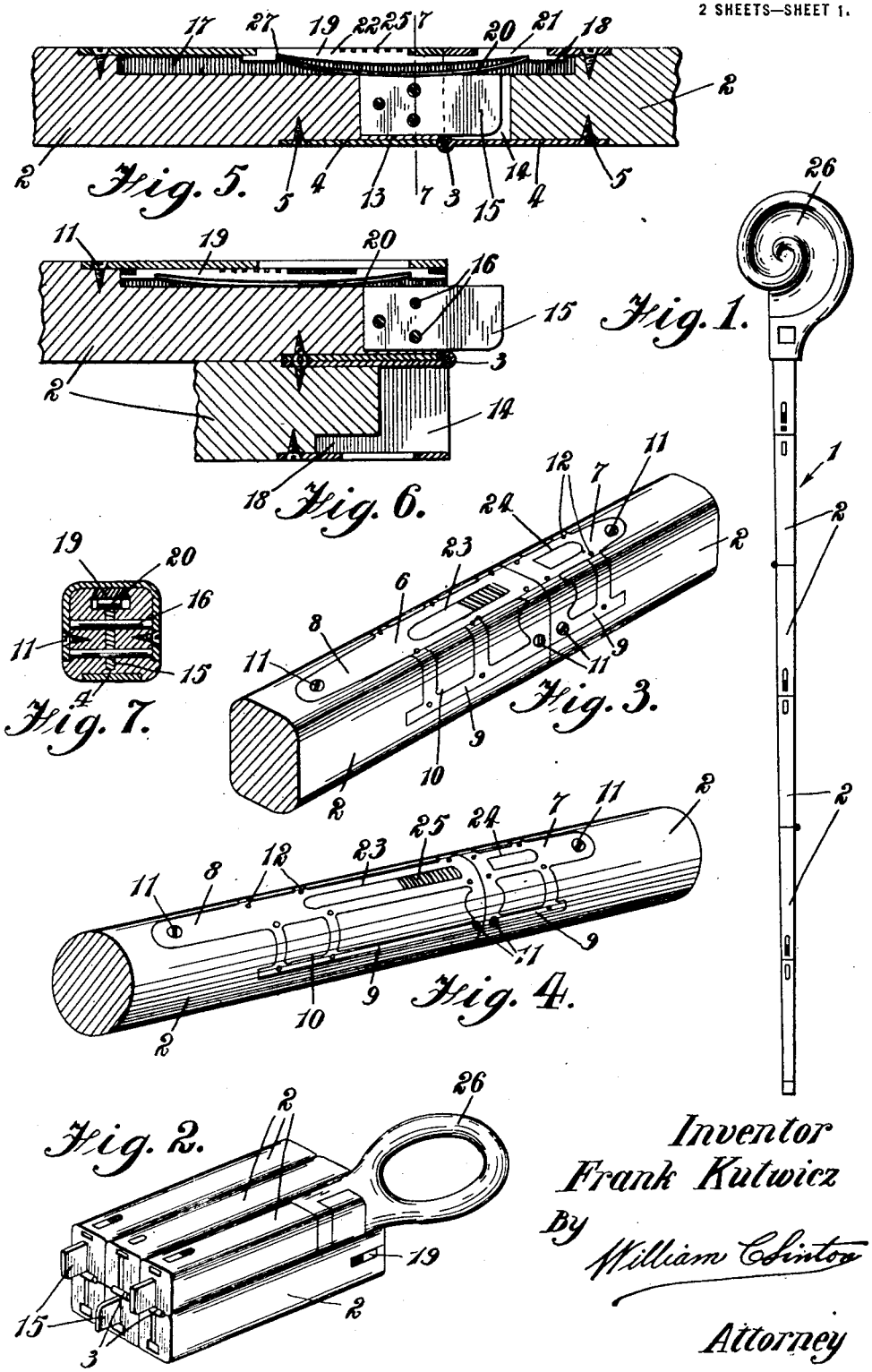
Inventor
Frank Kutwicz
By William C. Hinton
Attorney F. KUTWICZ.
COLLAPSIBLE CANE.
APPLICATION FILED FEB. 28, 1921.
1,396,372.
Patented Nov. 8, 1921.
2 SHEETS—SHEET 2.
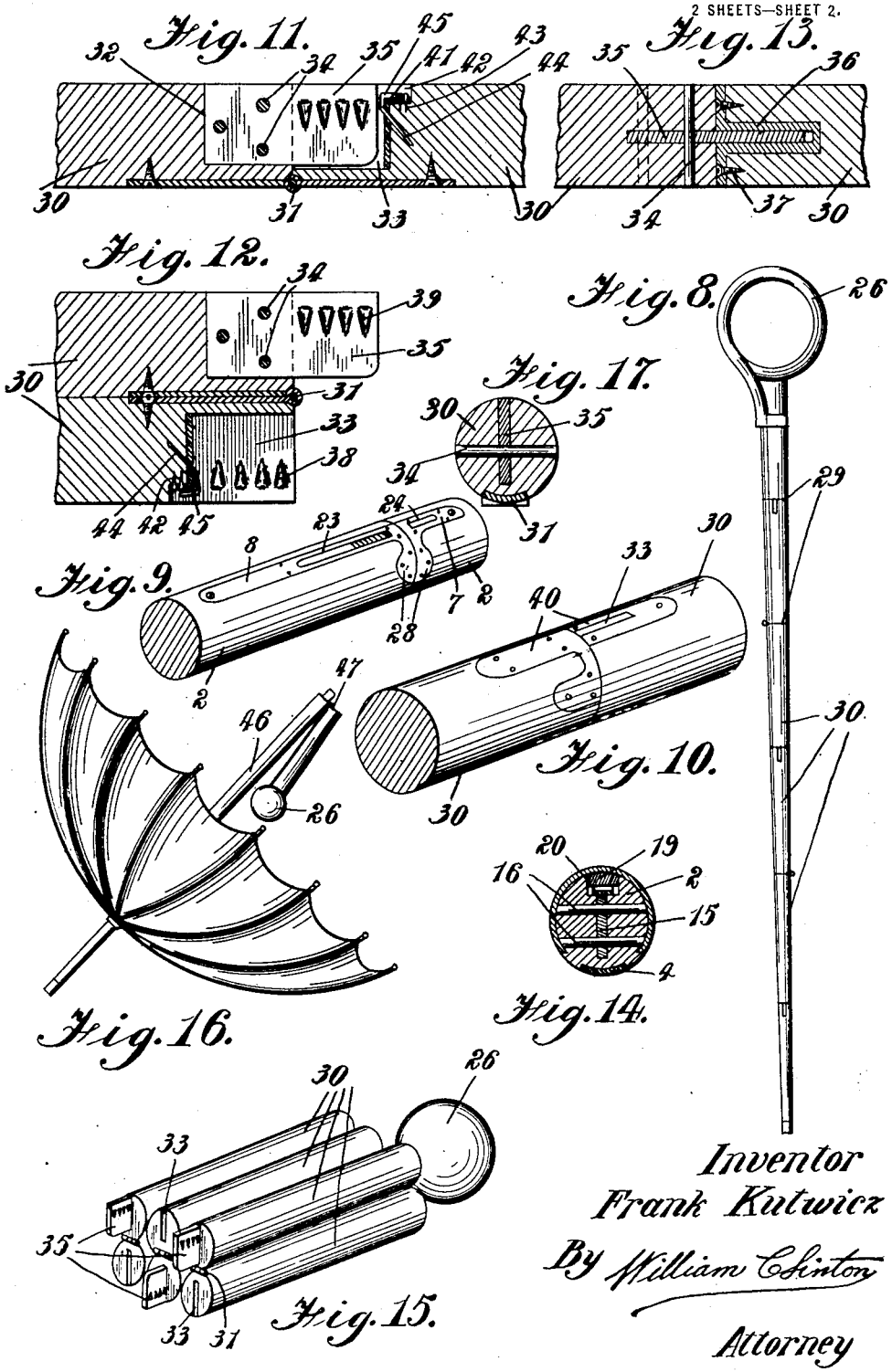
Inventor
Frank Kutwicz
By William C Hinton
Attorney

UNITED STATES PATENT OFFICE.

FRANK KUTWICZ, OF MONTREAL, QUEBEC, CANADA.

COLLAPSIBLE CANE.

1,396,372.   Specification of Letters Patent.   Patented Nov. 8, 1921.

Application filed February 28, 1921. Serial No. 448,420.

*To all whom it may concern:*

Be it known that I, FRANK KUTWICZ, a subject of the King of Great Britain, residing at Montreal, Province of Quebec, Canada, have invented certain new and useful Improvements in Collapsible Canes; and I do hereby declare that the following is a full, clear, and exact description of the invention, such as will enable others skilled in the art to which it appertains to make and use the same.

The present invention relates to new and useful improvements in collapsible canes.

The primary object of the invention is the provision of a cane including a plurality of hinged sections having means for locking the latter together when the cane is in extended position.

A further object of the invention is the provision of a collapsible cane including frames at the meeting ends of the hinged sections thereof for securing the sections together and for reinforcing the latter.

Another object of the invention is the provision in connection with said frames of locking means for engaging the latter and rigidly holding the cane in extended position against collapsing.

Still another object of the invention is the provision of a cane or the like such as above referred to which comprises a plurality of hingedly connected sections so designed and constructed that they may be held in extended position while in use but which may be quickly folded to require but little space when not desired.

A further object of the invention is the provision of a structure such as above described, which can be used for other purposes than for canes alone, such as for umbrella handles, scepters, and the like.

A still further object of the invention is the provision of a collapsible cane or the like, which will be comparatively simple and inexpensive to manufacture, reliable and efficient in use, and readily operated.

With the above and other objects in view, the present invention resides in the novel features of construction, formations, combinations, and arrangements of parts to be hereinafter more fully described, claimed, and illustrated in the accompanying drawings, forming a part of the present application, and in which:—

Figure 1 is a side view of a cane or the like constructed in accordance with the present invention;

Fig. 2 is a perspective view of a cane in folded position;

Fig. 3 is a perspective view of one of the joints shown applied to a cane which is substantially rectangular in cross section;

Fig. 4 is a similar view of the joint applied to a cane of circular cross section;

Fig. 5 is a longitudinal sectional view taken through the joint of a cane constructed in accordance with the present invention, showing the latter locked in extended position;

Fig. 6 is a similar view showing the same folded;

Fig. 7 is a transverse sectional view taken on the line 7—7 of Fig. 5;

Fig. 8 is a side view showing a modified form of a cane of cheaper construction;

Fig. 9 is a perspective view of a cane constructed in accordance with Fig. 4, but showing the cheaper frame construction;

Fig. 10 is a perspective view of one of the joints of the cane shown in Fig. 8;

Fig. 11 is a longitudinal sectional view through one of the joints, the cane sections being in extended position;

Fig. 12 is a similar view showing the latter folded;

Fig. 13 is a horizontal sectional view taken through one of the joints;

Fig. 14 is a transverse sectional view taken through Fig. 4;

Fig. 15 is a perspective view of a cane constructed in accordance with Fig. 8, showing the latter folded;

Fig. 16 is a view showing the joint applied to an umbrella handle; and

Fig. 17 is a transverse sectional view taken through Fig. 11.

Referring now to the accompanying drawings by corresponding characters of reference throughout the several views, and particularly to the form of the invention shown in Fig. 1, and the various details thereof shown in the other views, the numeral 1 designates in general a cane or scepter constructed in accordance with the present invention and which comprises a plurality of sections 2. The said cane or the like 1 may be either of substantially rectangular cross section with its corners rounded slightly as shown in Fig. 3, or may be of circular formation as shown in Fig. 4.

The sections 2 of the cane or the like are connected at opposite sides by hinges 3, the opposite leaves 4 of which may be fastened to the sections 2 by screws or other suitable fastening elements shown at 5.

By means of these hinges the cane may be folded from the position shown in Fig. 1 to that shown in Fig. 2 into a compact body which may be conveniently carried in the pocket of the user.

A pair of frames 6 and 7 are secured to the adjacent ends of the sections 2 and are bent to conform to the curvature of the cane and are countersunk therein, as clearly shown throughout the several figures of the drawings. The frames 6 and 7 comprise body portions 8 and side members 9 which may be cut out as shown at 10 in various shapes and sizes. These frames 6 and 7 are secured to the cane by screws or other fastening elements shown at 11 and small nails or the like shown at 12, which firmly hold the frames in their desired position.

The ends of the frames are provided with alining notches 13 and 14 in the former of which is secured a tongue 15 by means of the pins 16 or the like which project through openings in the end of the cane and alining openings in the said tongue.

The tongue 15 which is secured in the slot 13 is adapted to project also into the slot 14 when the sections 2 are in their extended position as particularly shown in Fig. 5.

Grooves 17 and 18 are arranged in alinement beneath the sides of the frames 6 and 7 and in these said grooves is slidably mounted a latch member 19 which is forced upwardly by a spring 20 into engagement with the frame as clearly shown in Fig. 5 for the purpose of locking the extensions in their extended positions against any undesired collapse.

The latches 19 are provided adjacent their opposite ends with shoulders 21 and 22 which project into the openings 23 and 24 formed in the frames 6 and 7, and it will thus be seen by this engagement that the said latches 19 will securely lock the various sections in their proper and desired position.

The shoulder 22 may be serrated as at 25 in order to provide a finger grip whereby when the said latches are depressed out of engagement with the frames they may be slid backwardly as shown in Fig. 6, thus allowing the cane or the like to fold in the desired manner.

Suitable handles shown at 26 of various conformations and ornamentations may be employed for the said cane or the like and may be secured thereto in any preferred manner. Several various forms of handles are shown in Figs. 1, 2, 8 and 15.

In order to prevent the displacement of the spring 20, above referred to, which bears at its lower edge in the bottoms of the grooves 17 and 18 and upon the tongue 15, the underside of the latch 19 is provided with shoulders 27 for engagement with the ends of the said spring 20 for preventing its displacement and insuring the necessary and desired movement thereof.

As shown particularly in Fig. 9, a modified form of frame is employed which is more simplified than that shown in Figs. 3 or 4, and in which the side members 9 are dispensed with. The inner ends of the frames terminate in the curved end extensions shown at 28.

Referring now more particularly to Fig. 8 of the drawings by corresponding characters of reference throughout the several views, a different form of joint is shown at 29 which is much cheaper in construction than that previously described and which may be used for manufacturing a cheap light cane of less durability than that previously mentioned.

In this form of the invention, the meeting ends of the sections 30 of the cane are united in the usual manner by the hinges 31 and are provided with alining slots 32 and 33 formed therein, in the former of which is secured by the pins 34 a tongue 35 which projects into the slot 33.

This slot 33 is preferably reinforced as shown in Fig. 13 by a metallic lining 36 secured to the ends of the sections by the screws or other fastening devices 37. The tongue 35 when the cane is extended fits between the sides of the lining 36 which is provided with recesses 38 in its opposite sides for engagement with the lugs 39 stamped upon the tongue 35. This obviously locks the sections in extended position and prevents their undesired collapsing.

The ends of the sections may be reinforced if desired by the frames which are shown at 40 to prevent the wood from splitting around the openings or slots 32 and 33.

In order to further insure the metallic lining 36 against displacement, the inner edge thereof is provided with a lateral flange 41 which extends into a notch 42 in which it is held by nails or other suitable fastenings shown at 43.

In order to additionally secure this member 36 in the position shown, a nail shown at 44 is driven through the inner end thereof and is bent around the flange 41 as shown at 45.

By this means, it will be seen that the loosening or displacement of the metallic lining 36 is prevented.

As shown in Fig. 16, the joint is employed in connection with the umbrella handle 46, wherein the handle is foldable, as shown at 47 by a joint corresponding to that shown in detail in Figs. 11, 12 and 13.

From the foregoing description, taken in connection with the accompanying drawings, it will be manifest that a collapsible cane or the like is provided, which will fulfil all of the necessary requirements of such a device, and it should be understood in this connection, that various minor changes in the specific details of construction can be resorted to within the scope of the appended claims, without departing from the spirit or sacrificing any of the advantages of the invention. It will be further understood that I am not to be limited to the structural details in combination with collapsible cane only, but may employ the same for any other use to which the various parts thereof will adapt themselves, such as the folding umbrella, the scepter, and any other desired device.

Having thus fully described the invention, what I claim as new and desire to protect by Letters Patent is:—

1. A collapsible cane including a plurality of sections, said sections having slots formed therein and communicating with each other, means for hingedly connecting the sections, a tongue secured within the slot in one section for insertion into the slot of the adjacent section, and an interlocking engagement between said tongue and section.

2. A collapsible cane of the type described, including hinged sections, said sections having slots formed therein and disposed in alinement, a tongue secured in one of said slots for insertion into the head of the adjacent section, a lining for one of said slots, and an interlocking engagement between the lining and said tongue, substantially as and for the purposes set forth.

3. The combination in a collapsible cane such as described, of a pair of hinged sections, said sections having alining slots provided therein, a tongue secured in one of said slots for extension into the other, said tongue having lugs formed upon the opposite sides thereof, a lining for the slot in which the tongue is adapted for projection, said lining having depressions formed therein for receiving the projections of the tongue, and means for retaining the lining in position against displacement.

In witness whereof I have hereunto set my hand.

FRANK KUTWICZ.